(12) United States Patent
Huang et al.

(10) Patent No.: US 12,311,463 B2
(45) Date of Patent: May 27, 2025

(54) NARROW GAP LASER-TIG ARC HYBRID WELDING APPARATUS AND METHOD

(71) Applicant: HARBIN WELDING INSTITUTE LIMITED COMPANY, Harbin (CN)

(72) Inventors: Ruisheng Huang, Harbin (CN); Bin Teng, Harbin (CN); Yan Zhang, Harbin (CN); Kai Xu, Harbin (CN); Dakui Fei, Harbin (CN); Bao Jiang, Harbin (CN); Pengbo Wu, Harbin (CN); Xiaomei Liang, Harbin (CN); Jipeng Zou, Harbin (CN)

(73) Assignee: HARBIN WELDING INSTITUTE LIMITED COMPANY, Heilongjiang (CN)

( * ) Notice: Subject to any disclaimer, the term of this patent is extended or adjusted under 35 U.S.C. 154(b) by 0 days.

(21) Appl. No.: 18/542,637

(22) Filed: Dec. 16, 2023

(65) Prior Publication Data

US 2025/0025960 A1  Jan. 23, 2025

Related U.S. Application Data

(63) Continuation of application No. PCT/CN2022/099048, filed on Jun. 16, 2022.

(30) Foreign Application Priority Data

Jun. 16, 2021 (CN) .......................... 202110664751.3

(51) Int. Cl.
*B23K 26/21* (2014.01)
*B23K 9/02* (2006.01)

(52) U.S. Cl.
CPC ............ *B23K 26/21* (2015.10); *B23K 9/0213* (2013.01)

(58) Field of Classification Search
None
See application file for complete search history.

(56) References Cited

U.S. PATENT DOCUMENTS

2008/0245774 A1   10/2008   Kim et al.

FOREIGN PATENT DOCUMENTS

| CN | 101890560 A | 11/2010 |
| CN | 102528248 A * | 7/2012 |

(Continued)

OTHER PUBLICATIONS

CN 109332899 A (Huang Xue) Feb. 15, 2019 [retrieved on Dec. 3, 2024]. Retrieved from Espacenet Database, translation by EPO and Google (Year: 2019).*

(Continued)

*Primary Examiner* — Steven W Crabb
*Assistant Examiner* — Theodore J Evangelista
(74) *Attorney, Agent, or Firm* — Troutman Pepper Locke LLP

(57) ABSTRACT

Disclosed are a narrow gap laser-TIG arc hybrid welding apparatus and method. The welding apparatus includes a welding gun body, a swing welding gun assembly, a welding wire feeding and heating assembly, and a gas conveying assembly; the swing welding gun assembly includes a welding gun rotating shaft, a stepper motor, a large gear, a pinion, an upper insulating sleeve, a lower insulating sleeve, a tungsten electrode clamp, and a tungsten electrode; the stepper motor is mounted on a motor connection seat; the pinion is mounted on the output shaft of the stepper motor; the large gear is mounted on the welding gun rotating shaft; the pinion is engaged with the large gear; the welding gun rotating shaft is mounted and positioned on the welding gun (Continued)

body; the tungsten electrode is mounted at the tail end of the welding gun rotating shaft by means of the tungsten electrode clamp.

16 Claims, 5 Drawing Sheets

(56) References Cited

FOREIGN PATENT DOCUMENTS

| CN | 101890560 B | * | 10/2012 | |
| CN | 105537737 B | * | 4/2018 | |
| CN | 108406118 A | | 8/2018 | |
| CN | 109332899 A | * | 2/2019 | |
| CN | 110052712 A | | 7/2019 | |
| CN | 110961789 A | | 4/2020 | |
| CN | 113385822 A | | 9/2021 | |
| CN | 111515541 B | * | 6/2022 | ........... B23K 26/348 |

OTHER PUBLICATIONS

CN 101890560 B (Liao Jian Xiong) Oct. 31, 2012 [retrieved on Dec. 3, 2024]. Retrieved from Espacenet Database, translation by EPO and Google (Year: 2012).*

CN 102528248 A (Liu Xia) Jul. 4, 2012 [retrieved on Dec. 3, 2024]. Retrieved from Espacenet Database, translation by EPO and Google (Year: 2012).*

CN 105537737 B (Jia Chuan Bao) Apr. 13, 2018 [retrieved on Dec. 3, 2024]. Retrieved from Espacenet Database, translation by EPO and Google (Year: 2018).*

CN 111515541 B (Peng Jin) Jun. 10, 2022 [retrieved on Dec. 3, 2024]. Retrieved from Espacenet Database, translation by EPO and Google (Year: 2022).*

PCT/CN2022/099048, International Search Report, dated Jul. 28, 2022.

* cited by examiner

NARROW GAP LASER-TIG ARC HYBRID WELDING APPARATUS AND METHOD

CROSS-REFERENCE TO RELATED APPLICATION

This patent application is a Continuation of International Patent Application No. PCT/CN2022/099048, filed on Jun. 16, 2022, which claims the benefit and priority of Chinese Patent Application No. 202110664751.3 filed with the China National Intellectual Property Administration on Jun. 16, 2021, the disclosure of which is incorporated by reference herein in its entirety as part of the present application.

TECHNICAL FIELD

The present disclosure belongs to the technical field of welding manufacturing, and in particular to a narrow gap laser-TIG (tungsten inert gas) arc hybrid welding apparatus and method.

BACKGROUND

Tungsten inert gas welding (TIG), as one of the traditional arc welding technologies, has many advantages, such as good arc stability, high reliability, and capability of achieving high quality welding and excellent weld seam, and thus is widely used in aerospace, petrochemical industry, marine engineering and other fields. However, as one of arc welding, TIG welding has the common shortcomings of the arc welding: the welding speed in the TIG and its wire filling welding process is low, which is generally 0.1 m/min-0.2 m/min, and the deposition efficiency of welding wire is low, especially for the welding of medium-thick structural parts, which requires multiple welding passes, resulting in low welding efficiency. Moreover, due to the low speed of TIG welding and the large heat input to the joint, it is easy to cause large welding deformation, and causes a series of shortcomings such as coarse structure, wide heat affected zone and weak performance of the welded joint at the same time. With the rapid development of nuclear power, aerospace and other fields in China, TIG welding method is gradually unable to fully satisfy the needs of various fields for high-quality and efficient welding manufacturing of their key components. Therefore, it is hoped to develop a novel welding method with low welding heat input, high welding efficiency and capability of achieving TIG welding quality.

Since 1990s, with the appearance and continuous development of high-power laser devices, laser welding technology has developed rapidly. Different from traditional welding heat sources, laser welding has the advantages of high energy density, fast processing speed, less post-welding deformation and residual stress, and narrow welding heat affected zone, and thus can achieve one-sided welding and double-sided forming without subsequent processing procedures. However, laser welding also has many disadvantages, such as: high requirements for groove assembly of a workpiece, easy generation of pores and cracks during welding, rapid cooling and solidification, and high hardness but reduced toughness of joints, etc.

Laser-TIG arc hybrid welding technology is a new welding technology in recent years. Two heat sources with completely different physical properties and energy transmission mechanisms are combined to act on a same welding pool at the same time, which not only gives full play to respective advantages of the two heat sources, but also makes up for their respective shortcomings, thus forming a brand-new and efficient heat source. The main advantages of the laser-TIG arc hybrid welding technology are embodied in the increase of weld penetration, the improvement of adaptability of welded joints, the enhancement of the stability of welding process, the improvement of weld microstructure, the reduction of welding defects, and the improvement of the production efficiency. Although the laser-TIG arc hybrid welding method has shown its advantages in many aspects, with the continuous improvement of product quality and production efficiency requirements, especially in the welding of large thick materials, due to the size limitation of the welding gun, in order to ensure the accessibility of the welding gun and the large groove area, the metal filling amount is large, which leads to great reduction of the welding efficiency of the product, large consumption of welding materials, high production cost, and serious welding deformation. Moreover, there are technical problems of interlayer and sidewall fusion in multiple layers and multiple passes in welding, which greatly affects the welding quality of products.

SUMMARY

To this end, the present disclosure is intended to provide a narrow gap laser-TIG arc hybrid welding apparatus and method, which can improve product quality, enhance welding efficiency, reduce welding cost, reduce welding deformation, and precisely control a weld width.

To achieve the objective above, the technical solution adopted by the present disclosure is achieved as follows:

A narrow gap laser-TIG arc hybrid welding apparatus includes a welding gun body, a swing welding gun assembly, a welding wire feeding and feeding assembly, and a gas conveying assembly. The swing welding gun assembly includes a welding gun rotating shaft, a stepper motor, a large gear, a pinion, an upper insulating sleeve, a lower insulating sleeve, a tungsten electrode clamp, and a tungsten electrode. The stepper motor is mounted on a motor connection seat, the pinion is mounted on an output shaft of the stepper motor, the large gear is mounted on the welding gun rotating shaft, and the pinion is engaged with the large gear. The welding gun rotating shaft is mounted and positioned on the welding gun body by means of the upper insulating sleeve and the lower insulating sleeve. The tungsten electrode is mounted at a tail end of the welding gun rotating shaft by means of the tungsten electrode clamp.

The welding wire feeding and heating assembly includes a hot wire connection seat, a conductive connecting rod, an upper insulating base, a lower insulating base, a wire guide tube, a contact tip connection seat, and a contact tip. An upper end of the conductive connecting rod is connected to the hot wire connection seat, and a lower end of the conductive connecting rod is connected to the contact tip connection seat. The contact tip is mounted on the contact tip connection seat. The conductive connecting rod is mounted at a left side of the welding gun body by means of the upper insulating base and the lower insulating base. The wire guide tube is mounted on the upper insulating base, a tail end of the wire guide tube is connected to the contact tip, and the hot wire connection seat is connected to a hot wire power cable.

A TIG welding arc generated by the tungsten electrode and a focus point of a laser beam intersect at a place, and together act on a same region. The gas conveying assembly includes a left gas guide tube and a right gas guide tube, the left gas guide tube and the right gas guide tube are both mounted on the welding gun body and arranged on left and right sides of the welding gun rotating shaft. Tail ends of the left gas guide tube and the right gas guide tube are respectively arranged corresponding to left and right gas chambers at a lower end of the welding gun body, and a gas screen is arranged in each gas chamber. A welding shielding gas is conveyed to the left and right gas chambers at the lower end of the welding gun body through the left gas guide tube and the right gas guide tube, and then are conveyed to a welding arc region by means of the gas screens.

Further, the welding gun rotating shaft is of a double-layer tubular structure, and includes an outer tube and an inner tube. The outer tube communicates with the inner tube, the outer tube communicates with a water inlet, and the inner tube communicates with a water outlet. Cooling water flows in the outer tube by means of the water inlet and the flows out from the inner tube via the water outlet.

Further, the left gas guide tube, the welding gun rotating shaft, the right gas guide tube, the conductive connecting rod and the wire guide tube are arranged side by side.

Further, the wire guide tube is clamped and positioned on the insulating base by means of a retaining clamp, and the retaining clamp is used to adjust a feeding position of a welding wire.

Further, the welding gun body is of an ultra-thin structure, and has a thickness of 12 mm.

Further, the periphery of the stepper motor, the motor connection seat and the hot wire connection seat is covered with a protective cover.

Further, the apparatus includes a welding gun connection seat. The welding gun connection seat is connected to the welding gun body, and the welding gun connection seat is connected to a mounting connecting plate.

The mounting connecting plate is arranged outside the protective cover, and the mounting connecting plate is connected to an external walking mechanism.

Further, the hot wire connection seat is connected to an external hot wire mechanism by means of a hot wire power cable.

Further, a laser device used for the laser beam is a YAG solid-state laser device, a semiconductor laser device, or an optical fiber laser device. The welding wire has a diameter from 0.8 mm to 2.4 mm.

A welding method of a narrow gap laser-TIG arc hybrid welding apparatus specifically includes the following steps:

1. Prior to Welding:
   (1) designing a narrow gap groove structure according to the size of a hybrid welding gun, so as to ensure accessibility of a welding gun in a depth direction of a weld seam;
   (2) polishing or cleaning a workpiece to be welded, and assembling and positioning the polished or cleaned workpiece to be welded;
   (3) adjusting and confirming a spatial position relationship among a welding wire, laser and a tungsten electrode;
   (4) checking operating states of water, electricity, gas, and a welding device;
   (5) setting welding parameters of the welding wire, the laser and a TIG arc, where the welding parameters include wire feeding speed, a welding wire diameter, laser defocus amount, laser power, swing amplitude and frequency of laser, a TIG arc current, a voltage, and a length, swing angle and frequency of a tungsten electrode;
2. During Welding
   turning on a control switch, enabling the laser and arc to act on a surface of the workpiece, synchronously and stably feeding the welding wire into a welding pool, and meanwhile, moving a gun head in a welding direction at a set speed, wherein during the welding, narrow gap welding of a thick plate is finally achieved by means of a swing of a laser spot and a left-right swing of the tungsten electrode.

Compared with the prior art, the narrow gap laser-TIG arc hybrid welding apparatus and method have the following advantages:

(1) The product welding efficiency is improved while the welding quality is ensured. The narrow gap laser-TIG arc hybrid welding apparatus is a narrow gap laser-TIG hybrid welding gun integrating water, electricity, gas and wire, which can achieve continuous production and use for 24 hours. Meanwhile, the designed hybrid welding gun can be used under a small-angle groove, which can reduce filling amount of the welding wire and greatly improve the welding efficiency. Compared with traditional welding, the welding efficiency is improved by more than three times.

(2) The TIG arc has a swing function, which is used for optimization and adjustment of weld width under a narrow-groove welding condition.

(3) In the aspect of improving the welding efficiency, the use of a hot wire apparatus to heat the welding wire in the welding process is also proposed, so as to improve deposition efficiency of the welding wire in the welding process.

(4) By using a welding mode that the welding wire is in the front, the swinging laser is in the center, and followed by the TIG arc, the welding wire, the laser and the arc act together on a welding pool. During the welding, the laser swings vertically to the weld seam. When the laser melts the welding wire and a base metal, the addition of the laser swing increases the spreadability of welding pool metal, and also improves the technology difficulty of difficult centering of the welding wire and the laser caused by the concentration of laser energy. The TIG arc acts on the back of the whole welding pool. Due to the fact that the energy density of the TIG arc is smaller than that of the laser, the thermal effect of the arc on the base metal and welding pool can greatly improve the spreadability of welding pool metal, which is conducive to achieving good weld forming effect. Meanwhile, the TIG tungsten electrode can rotate to ensure the fusion of both sides of a weld with the side wall of the base metal, so as to greatly improve the welding quality of the product.

BRIEF DESCRIPTION OF THE DRAWINGS

The accompanying drawings, constituting a part of the present disclosure, are used to provide a further understanding of the present disclosure. The illustrative embodiments of the present disclosure and their descriptions are used to explain the present disclosure, and do not constitute an undue limitation of the present disclosure. In the drawings.

In the drawings.

A—swing welding gun assembly; B—welding wire feeding and heating assembly; C—weld; D—welding arc region; 1—welding gun rotating shaft; 2—pinion; 3—large gear; 4—upper insulating sleeve; 5—protective cover; 6—stepper motor; 7—motor connection seat; 8—welding gun connection seat; 9—mounting connecting plate; 10—hot wire connection seat; 11—conductive connecting rod; 12—retaining clamp; 13—upper insulating base; 14—welding gun body; 15—left gas guide tube; 16—lower insulating base; 17—wire guide tube; 18—contact tip connection seat; 19—contact tip; 20—laser beam; 21—right gas guide tube; 22—lower insulating sleeve; 23—gas screen; 24—tungsten electrode clamp; 25—tungsten electrode; 26—outer tube; 27—inner tube; 28—water inlet; 29—water outlet.

DETAILED DESCRIPTION OF THE EMBODIMENTS

It should be noted that the embodiments in the present disclosure and the features in the embodiments can be combined with each other without conflict.

The present disclosure is described in detail below with reference to the accompanying drawings and embodiments.

Figure 1:
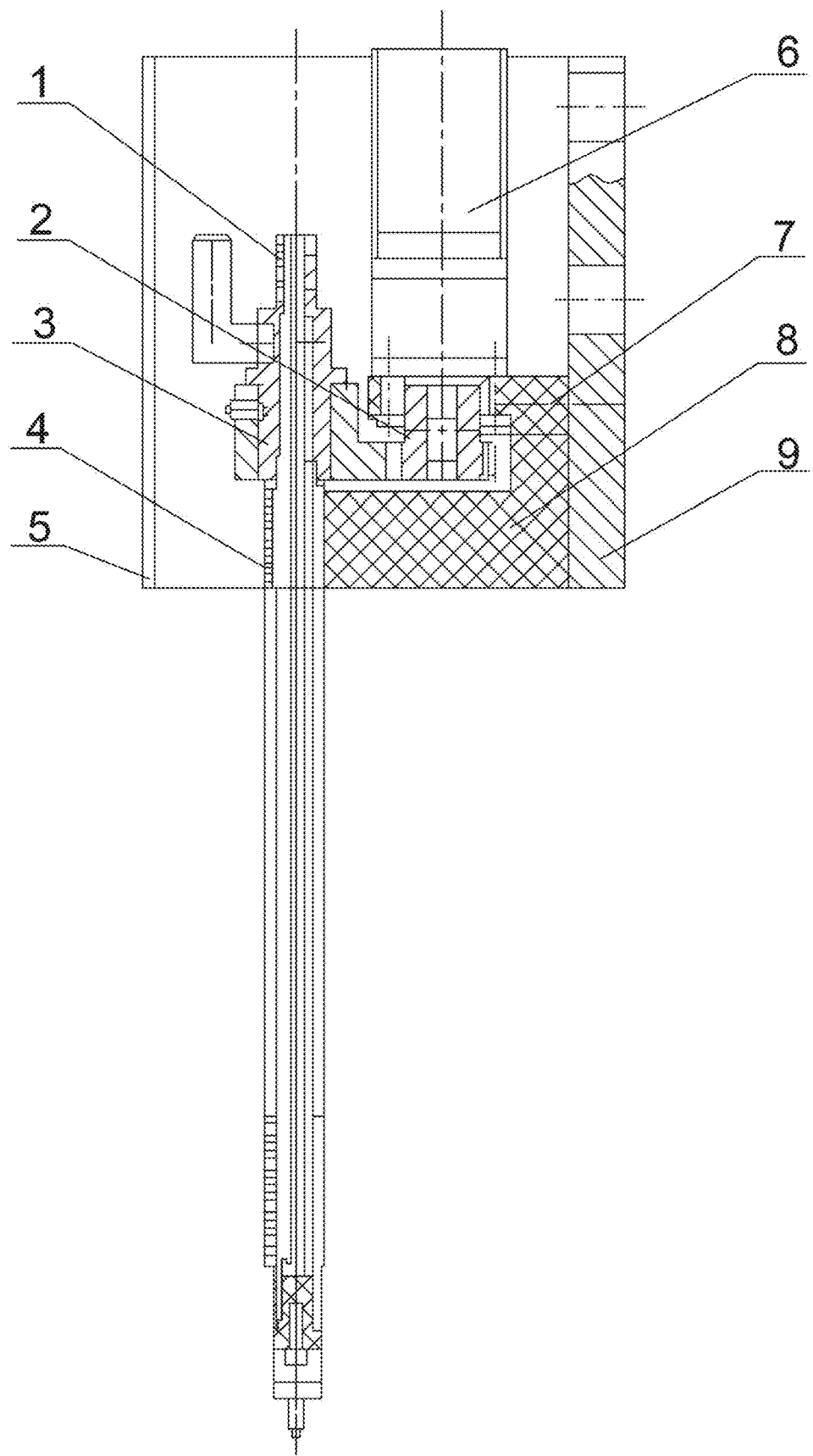
FIG. 1 is a front sectional view of a narrow gap laser-TIG arc hybrid welding apparatus according to an embodiment of the present disclosure.
Figure 2:
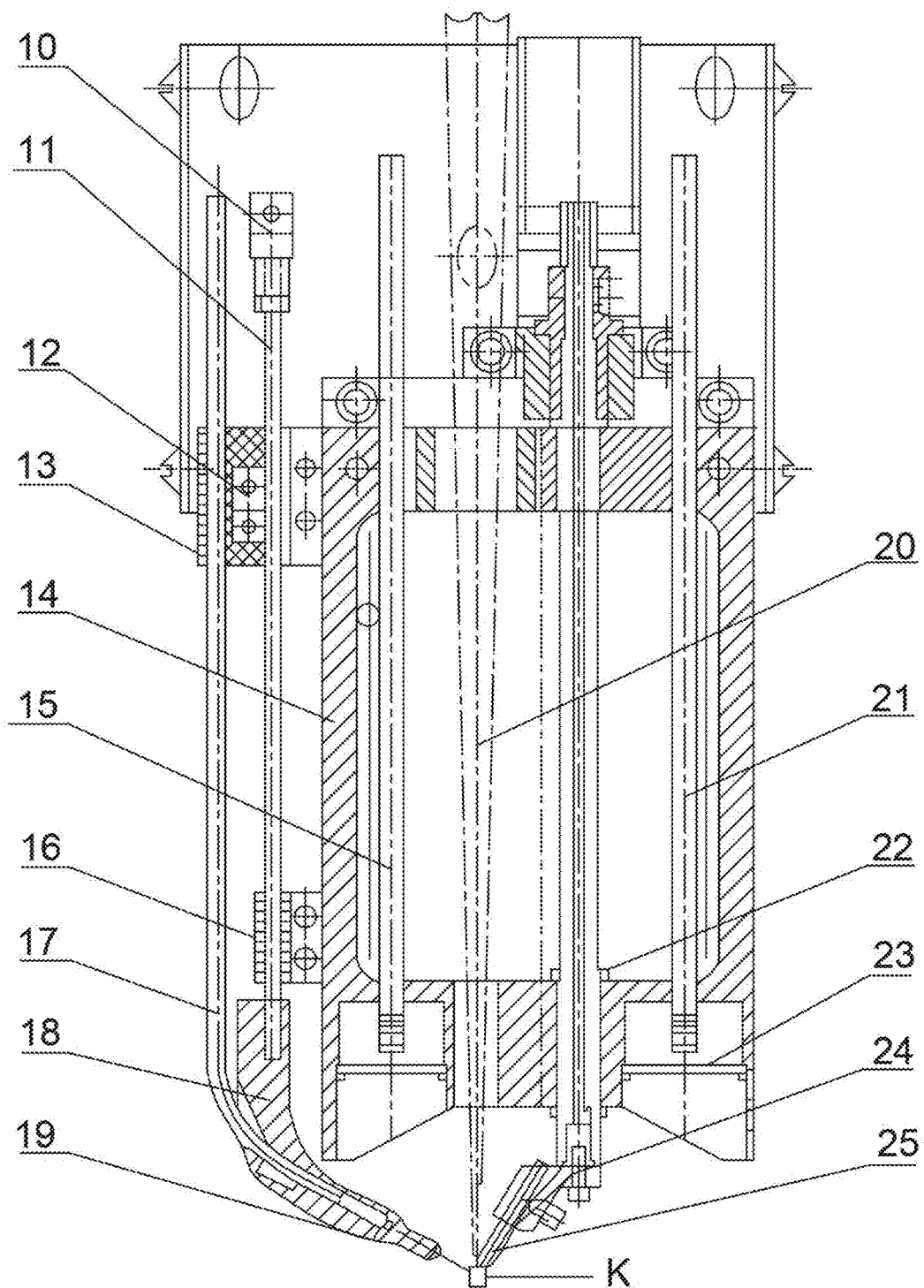
FIG. 2 is a side sectional view of a narrow gap laser-TIG arc hybrid welding apparatus according to an embodiment of the present disclosure.
Figure 3:
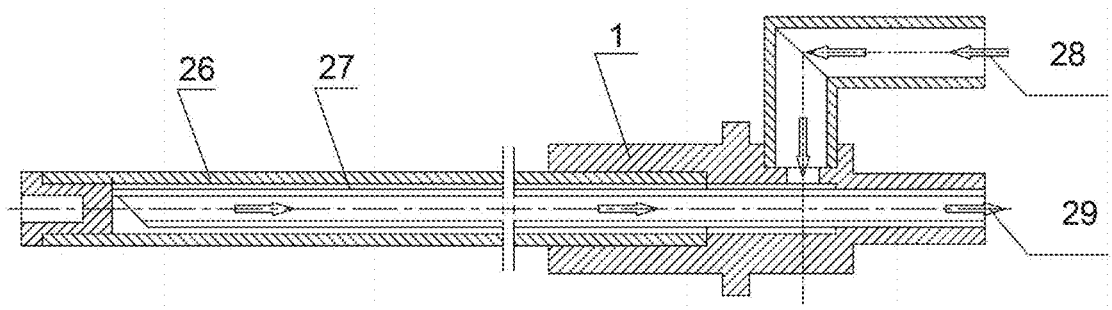
FIG. 3 is a structural schematic diagram of a welding gun rotating shaft.

As shown in FIG. 1 to FIG. 3, A narrow gap laser-TIG arc hybrid welding apparatus includes a welding gun body 14, a swing welding gun assembly A, a welding wire feeding and feeding assembly B, and a gas conveying assembly. The swing welding gun assembly includes a welding gun rotating shaft 1, a stepper motor 6, a large gear 3, a pinion 2, an upper insulating sleeve 4, a lower insulating sleeve 22, a tungsten electrode clamp 24, and a tungsten electrode 25. The stepper motor 6 is mounted on a motor connection seat 7, the pinion 2 is mounted on an output shaft of the stepper motor 6, the large gear 3 is mounted on the welding gun rotating shaft 1, and the pinion 2 is engaged with the large gear 3. The welding gun rotating shaft 1 is mounted and positioned on the welding gun body 14 by means of the upper insulating sleeve 5 and the lower insulating sleeve 22. The tungsten electrode 25 is mounted at a tail end of the welding gun rotating shaft 1 by means of the tungsten electrode clamp 24.

The welding wire feeding and heating assembly includes a hot wire connection seat 10, a conductive connecting rod 11, an upper insulating base 13, a lower insulating base 16, a wire guide tube 17, a contact tip connection seat 18, and a contact tip 19. An upper end of the conductive connecting rod 11 is connected to the hot wire connection seat 10, and a lower end of the conductive connecting rod 11 is connected to the contact tip connection seat 18. The contact tip 19 is mounted on the contact tip connection seat 18. The conductive connecting rod 11 is mounted at a left side of the welding gun body 14 by means of the upper insulating base 13 and the lower insulating base 16. The wire guide tube 17 is mounted on the upper insulating base 5 by means of a retaining clamp 12, a tail end of the wire guide tube 17 is connected to the contact tip 19, and the hot wire connection seat 10 is connected to a hot wire power cable.

A TIG welding arc generated by the tungsten electrode 25 and a focus point of a laser beam 20 intersect at a place, and together act on a same welding pool. The gas conveying assembly includes a left gas guide tube 15 and a right gas guide tube 21, the left gas guide tube 15 and the right gas guide tube 21 are both mounted on the welding gun body 14 and arranged on left and right sides of the welding gun rotating shaft 1. Tail ends of the left gas guide tube 15 and the right gas guide tube 21 are respectively arranged corresponding to left and right gas chambers at a lower end of the welding gun body 14, and a gas screen 23 is arranged in each gas chamber. A welding shielding gas is conveyed to the left and right gas chambers at the lower end of the welding gun body 14 through the left gas guide tube 15 and the right gas guide tube 21, and then are conveyed to a welding arc region D by means of the gas screens 13.

The welding gun rotating shaft 1 is of a double-layer tubular structure and has a water-cooling function, and includes an outer tube 26 and an inner tube 27. The outer tube 26 communicates with the inner tube 27, the outer tube 26 communicates with a water inlet 28, and the inner tube 27 communicates with a water outlet 29. Cooling water flows in the outer tube 26 by means of the water inlet 28 and the flows out from the inner tube 27 via the water outlet 29. It is ensured that the tungsten electrode 25 mounted at a front end of the welding gun rotating shaft 1 is cooled in real time during the welding.

The left gas guide tube 15, the welding gun rotating shaft 1, the right gas guide tube 21, the conductive connecting rod 11 and the wire guide tube 17 are arranged side by side. Such an arrangement makes the structure compact.

The wire guide tube 17 is clamped and positioned by means of the retaining clamp 12, and the retaining clamp 12 is used to adjust a feeding position of a welding wire. The retaining clamp 12 can be loosened to adjust the contact tip to move up and down and rotate left and right.

The welding gun body 14 is of an ultra-thin structure, and has a thickness of 12 mm. The design here is to adapt to narrow gap groove. The stable, high-quality and efficient welding of a large thick material with a thickness of 200 mm and a narrow groove can be achieved. The welding gun body can be used for a groove structure with a groove width less than 18 mm. The distance and angle between the welding wire and laser and between the laser and a TIG tungsten electrode can be adjusted according to the change of parameters. The hybrid welding gun has the functions of water cooling and gas shielding, and can be continuously used for 24 hours.

The periphery of the stepper motor 6, the motor connection seat 7 and the heat wire connection seat 10 is covered with a protective cover 5. The protective cover 5 is mainly used for anti-collision protection of various joints and motor components at the upper end of the welding gun body 14.

The apparatus further includes a welding gun connection seat 8. The welding gun connection seat 8 is connected to the welding gun body 14, and the welding gun connection seat 8 is connected to a mounting connecting plate 9.

The mounting connecting plate 9 is arranged outside the protective cover 5, and the mounting connecting plate 9 is connected to an external walking mechanism, so as to be conveniently connected to an external structure.

The hot wire connection seat 10 is connected to an external hot wire mechanism by means of a hot wire power cable, which is used to preheat the welding wire before welding, so as to improve the filling efficiency of the welding wire and improve deposition efficiency of the welding wire during the welding.

The operation process of the welding apparatus provided by the present disclosure is as follows: a welding wire is automatically sent to a welding arc region by means of a wire guide tube 17 and a contact tip 19, so as to achieve metal material filling. The heat wire connection seat 10 is used to connect a hot wire power cable, and a hot wire current is conducted to the contact tip 19 by means of a conductive connecting rod 11 to heat the welding wire, thus achieving a hot wire TIG welding function. A stepper motor 6 drives a large gear 3 mounted on a welding gun rotating shaft 1 to rotate by means of a pinion 2 mounted on the output shaft, such that the large gear 3 drives the welding gun rotating shaft 1 to swing to achieve the left-right swing of a tungsten electrode 25 during the welding. In the welding process, the welding shielding gas is conveyed to left and right gas chambers at a front end of the welding gun body 14 by means of a left gas guide tube 15 and a right gas guide tube 21, and then is uniformly conveyed to a welding arc region by means of gas screens, so as to protect the welding arc in real time. A TIG welding arc generated by the tungsten electrode 25 and a focus point of a laser beam 20 intersect at a K point to form a hybrid arc of laser and TIG welding, thus achieving high quality and efficient welding in a double scanning mode under the condition of narrow gap groove.

Figure 4:
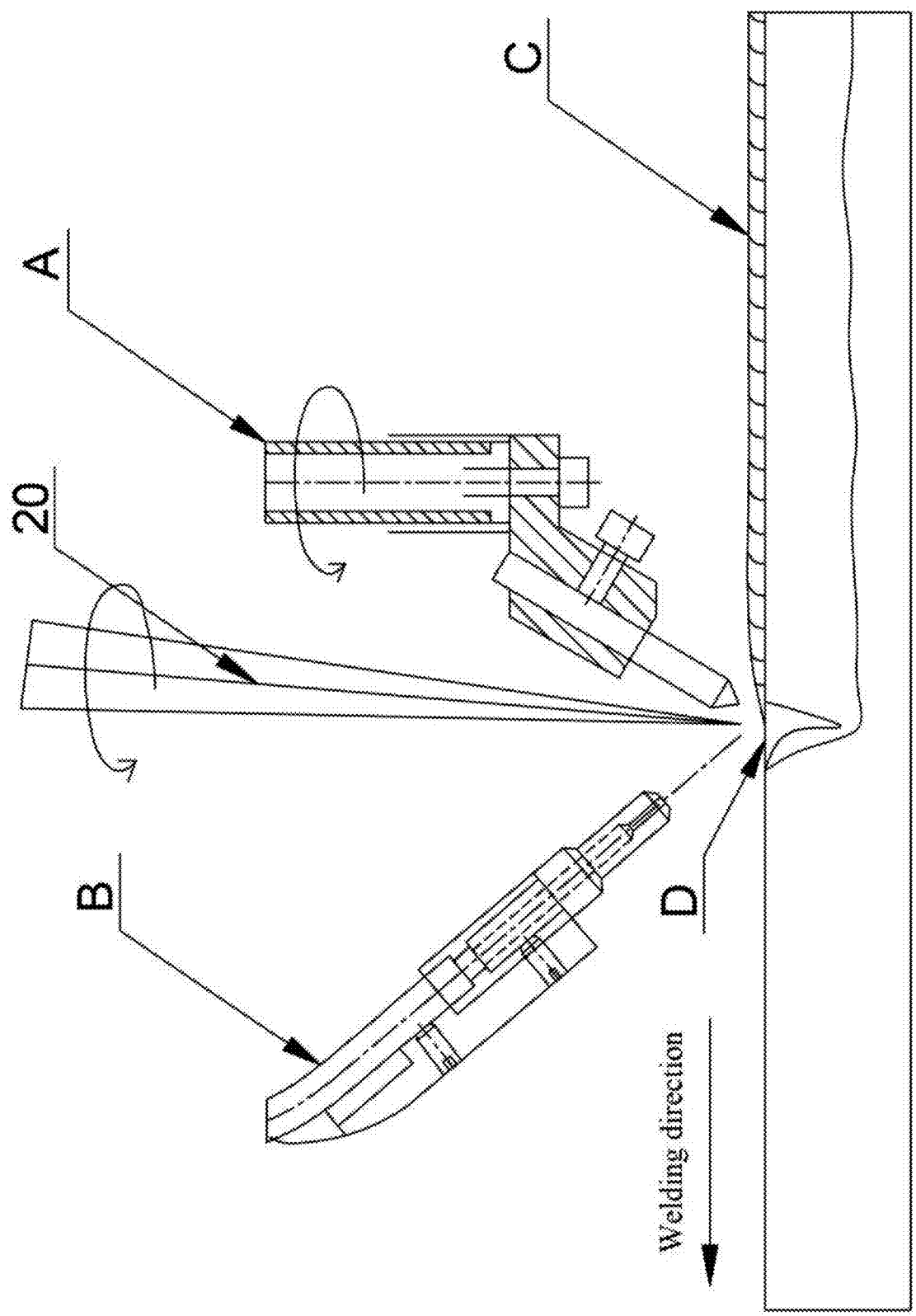
FIG. 4 is a schematic diagram of a welding method of a narrow gap laser-TIG arc hybrid welding apparatus.

As shown in FIG. 4, a welding method of a narrow gap laser-TIG arc hybrid welding apparatus specifically includes the following steps:

1. Prior to Welding
   (1) A narrow gap groove structure is designed according to the size of a hybrid welding gun to ensure the accessibility of a welding gun in a depth direction of a weld seam.
   (2) A workpiece to be welded is polished or cleaned, and the polished or cleaned workpiece to be welded is assembled and positioned.
   (3) A spatial position relationship among a welding wire, laser and a tungsten electrode is adjusted and confirmed.
   (4) Operation states of water, electricity, gas, and a welding device are checked.
   (5) Welding parameters of the welding wire, the laser and TIG arc are set, where the welding parameters include wire feeding speed, a welding wire diameter, laser defocus amount, laser power, swing amplitude and frequency of laser, a TIG arc current, a voltage, and a length, swing angle and frequency of a tungsten electrode.

2. During Welding

A control switch is turned on, the laser and arc act on a surface of the workpiece, the welding wire is synchronously and stably fed into a welding pool, and meanwhile, a gun head moves in a welding direction at a set speed, where during the welding, the swing of the laser spot cooperates with the left and right swing of the tungsten electrode 25 to finally achieve the narrow gap welding of a thick plate.

For the welding under the condition of narrow gap groove, in order to achieve the stability and reliability of the welding quality, double means are adopted in the welding process to ensure the quality of welded joints.

Swing of Laser Spot

In order to ensure the good fusion between layers in the welding process, the laser spot acts on a welding pool in the form of swing in the welding process. Firstly, a phenomenon of poor fusion between the layers caused by concentrated laser energy, large weld penetration at the center position of the laser spot and shallow weld penetration at an edge position of the laser spot can be solved. Secondly, for the problems that the welding process is still an unstable process, and after the end of each welding pass, the surface state of the weld is different, affecting the quality of the next weld, the swing of the laser can reduce the influence of the previous welding pass. Thirdly, for the problem that the welding wire acts on the front end of the welding pool during the welding, the swing of laser can increase the width of the welding pool, and thus the requirement for the position accuracy of the front end of the welding wire is reduced. In addition, with the addition of laser, the melting amount of the welding wire per unit time is greatly improved, that is, the feeding speed of the welding wire per unit time is increased, so the metal deposition efficiency per unit time is improved, and the welding efficiency is greatly improved.

Rotation and Swing of Tungsten Electrode

During the welding, the tungsten electrode 25 is mounted on the welding gun rotating shaft 1 by means of the tungsten electrode clamp 24, and the stepper motor 6 is used to drive the large gear 3 mounted on the welding gun rotating shaft 1 by means of the pinion 2 mounted on an output shaft, so as to achieve left-right swing of the tungsten electrode 25 during the welding.

During the welding, a rotation angle of the tungsten electrode can be set according to a groove gap, so as to ensure the accessibility of a welding position of the tungsten electrode in the groove. Meanwhile, the rotation speed of the tungsten electrode and the residence time of the tungsten electrode at limiting positions on both sides of the rotation can be set, which greatly reduce the phenomenon that the side wall is not fused in the narrow gap groove welding process. During the welding, the position and height of the hybrid welding gun can be adjusted in real time through an arc voltage tracking function of the TIG arc, so as to ensure consistency between the relative positions of the arc and the workpiece, and achieve the stable welding in the whole welding process.

In the process of multi-layer and multi-pass welding of a thick plate, in order to ensure the stability of welding quality, the swing amplitude and frequency of the laser and the rotation angle and frequency of the arc have a great influence on the fusion of the welding sidewall under the condition of narrow gap groove, which should be adjusted according to the weld width of groove.

The laser and the TIG arc act on a welding pool. The laser is in front and followed by the arc. The welding wire is fed into the welding pool in a weld direction in front of the laser, melted under the action of the laser and enters the welding pool. The base metal is melted under the joint action of the arc and the laser to achieve the metallurgical bonding effect between the welding material and the base metal. With the addition of double heat sources, the fusion quality of the weld is improved, the forming effect of the weld is improved, and the melting speed of the welding wire is increased.

A laser device used for the laser beam is a YAG solid laser device, a semiconductor laser device, or an optical fiber laser device. The laser output is continuous laser or pulsed laser, and the laser power is 10 W to 10000 W. The laser beam is scanning laser, several typical laser scanning paths include "straight line"-shaped, "8"-shaped, circle, polygon, sawtooth and sine wave, and each scanning path has two different beam motion directions: clockwise and counterclockwise.

The welding apparatus is equipped with an external hot wire interface, the melting speed of the welding wire is improved, and the feeding speed of the welding wire under the same parameter is improved. The welding wire has a diameter from 0.8 mm to 2.4 mm.

The TIG arc is in an L-shaped design and can rotate around a guide rod. The weld width may be adjusted according to an extending length, a rotation angle and frequency of the tungsten electrode.

The narrow gap laser-TIG hybrid welding apparatus may satisfy the welding demands of carbon steel, stainless steel, aluminum alloy, nickel-based alloy and other materials, and the applicable plate thickness range is 0.5 mm to 200 mm.

A high-quality/efficient narrow gap laser-TIG arc hybrid welding method is provided, with purposes of improving the welding quality of products, enhancing welding efficiency, reducing welding cost, and reducing welding deformation. In this method, two heat sources, laser and arc, are combined in a welding pool, so the arc stability is enhanced. Meanwhile, the technical problem of interlayer and sidewall fusion in multiple layers and multiple passes is solved using laser swing and arc rotation, and the welding quality of products is greatly improved. In the aspect of welding efficiency, in order to reduce the metal filling of the weld, a narrow gap laser-TIG hybrid welding gun is designed and developed, which greatly reduces the groove volume. Secondary, due to the action of the double heat sources, the metal melting speed of the welding wire is improved, the feeding speed of the welding wire is improved, and the metal deposition efficiency per unit time is greatly improved. Furthermore, due to the adding of the hot wire apparatus, the welding wire is preheated in advance, and thus the feeding speed of the welding wire is improved under the same parameter. In addition, due to the reduction of overall welding heat input and the mode of double heat sources, the welding deformation and the weld forming quality have also been greatly improved.

A specific embodiment is provided below, a narrow gap laser-TIG arc hybrid welding method for a large-thick high-strength steel is provided.

(1) Material: 10Ni5CrMoV high-strength steel.
(2) Plate thickness: 120 mm.
(3) Welding wire: JS80, Φ 1.2 mm.
(4) Groove design: a composite symmetric groove design is adopted, the root of which is a U-shaped groove structure, a blunt edge of the groove is 4 mm, and the groove has an angle of 2°.
(5) A workpiece to be welded is polished and cleaned, and the polished or cleaned workpiece to be welded is assembled and positioned, and in consideration of the influence of welding deformation on the groove width, anti-deformation treatment needs to be conducted.
(6) A spatial position relationship among the welding wire, the laser and the tungsten electrode is adjusted and confirmed, where a spacing between the laser and the tungsten electrode is 3-4 mm, a forward tilt angle of the laser is 5°, a forward tilt angle of the tungsten electrode is 35°, the tungsten electrode has a diameter of 2.4 mm, the distance between the tungsten electrode and the workpiece is 2-2.5 mm, the welding wire is fed to the front end of the laser, and the welding wire has a diameter of 1.2 mm.
(7) Operating states of water, electricity, gas, and a welding device are checked.
(8) Welding parameters of the welding wire, laser and TIG arc are set, where the wire feeding speed is 4-6 m/min, the laser backing weld power is 5-6 kW, the laser filling and cap weld power is 2-3 KW, the laser defocus amount is +5 mm, the swing amplitude and frequency of the laser are 3-5 mm and 40-60 Hz, respectively, the welding speed is 0.4-0.8 m/min, a welding current is 160-200 A, a welding voltage is 12-16 V, and the swing amplitude and swing frequency of the tungsten electrode are 2-4 mm and 3-5 Hz, respectively.
(9) A control switch is turned on, the laser and the arc act on the surface of the workpiece, the welding wire is synchronously and stably fed into the welding pool. The gun head moves in a welding direction according to the set speed. For the welding under the condition of narrow gap groove, in order to achieve the stability and reliability of the welding quality, double means are adopted in the welding process to ensure the quality of welded joints.

When the swing of laser spot and the rotation and swing of the tungsten electrode are required, the operation process of the rotation and swing of the tungsten electrode is as follows: in the welding process, the tungsten electrode 25 is mounted on the welding gun rotating shaft 1 through the tungsten electrode clamp 24, and the stepper motor 6 is used to drive the large gear 3 mounted on the welding gun rotating shaft 1 by means of the pinion 2 mounted on an output shaft, so as to achieve the left-right swing of the tungsten electrode 25 in the welding process. During welding process, the good quality of the welded joint is achieved by means of the swing of the tungsten electrode and the swing of the laser spot.

In the welding process, the rotation angle of the tungsten electrode can be set according to a groove gap, so as to ensure the accessibility of a welding position of the tungsten electrode in the groove. Meanwhile, the rotation speed of the tungsten electrode and the residence time of the tungsten electrode at limiting positions on both sides of the rotation can be set, which greatly reduce the phenomenon that the side wall is not fused in the narrow gap groove welding process.

Figure 5:
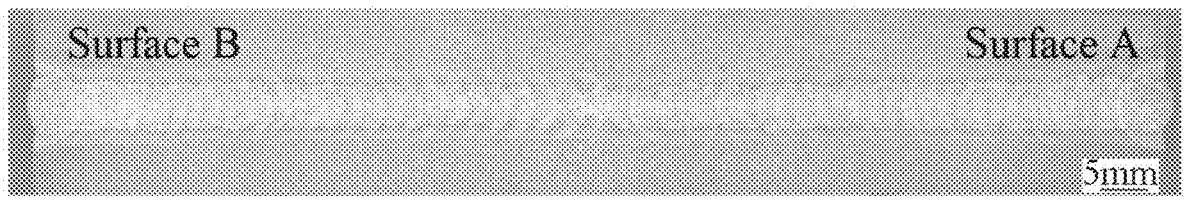
FIG. 5 is a photo of a finished workpiece welded by a welding method of a narrow gap laser-TIG arc hybrid welding apparatus.

During the welding, the position and height of the hybrid welding gun can be adjusted in real time through an arc voltage tracking function of the TIG arc, so as to ensure consistency between the relative positions of the arc and the workpiece, and achieve the stable welding in the whole welding process. The welding is carried out according to the set trajectory, and the welding method adopts multi-layer single-pass welding, that is, each layer is welded one pass, and the welded workpiece as shown in FIG. 5 is welded, where the weld has good welding quality and small deformation.

The present disclosure has the following beneficial effects:

(1) High-quality welding under a high-speed condition: compared with the traditional TIG welding, the welding speed is improved by more than three times.
(2) High deposition efficiency: compared with the traditional TIG welding, the metal deposition efficiency is improved by more than three times by using the double heat source mode and the welding wire preheating method proposed in the present disclosure.
(3) Precise control of weld width: in the combination of tungsten electrode swing welding and laser scanning, the weld width can be precisely controlled by the rotation amplitude of the tungsten electrode.
(4) Applicability for efficient welding of thick materials: the designed narrow gap laser-TIG arc hybrid welding gun head can achieve the welding of a plate with the thickness less than 200 mm and a groove width less than 18 mm.
(5) Reduction of consumption of welding materials: compared with the conventional groove, in the groove used for narrow gap welding-TIG arc hybrid welding, the groove filling area of the groove is greatly reduced and the consumption of the welding materials is reduced by more than two times due to the reduction of the groove angle.

(6) Significant reduction of welding deformation: compared with the traditional TIG welding, the metal deposition amount is reduced, the number of welding layers and welding passes is reduced, and the welding deformation is reduced by 30%.

(7) Great reduction of production cost: the reduction of the consumption of welding materials and the improvement of the welding efficiency greatly reduce the production cost.

The above is only the preferred embodiment of the present disclosure, and is not used to limit the present disclosure. Any modification, equivalent substitution, improvement, etc. made within the spirit and principle of the present disclosure should be included in the scope of protection of the present disclosure.

We claim:

1. A narrow gap laser-TIG (tungsten inert gas) arc hybrid welding apparatus, comprising a welding gun body, a swing welding gun assembly, a welding wire feeding and heating assembly, and a gas conveying assembly, wherein the swing welding gun assembly comprises a welding gun rotating shaft, a stepper motor, a large gear, a pinion, an upper insulating sleeve, a lower insulating sleeve, a tungsten electrode clamp, and a tungsten electrode; the stepper motor is mounted on a motor connection seat, the pinion is mounted on an output shaft of the stepper motor, the large gear is mounted on the welding gun rotating shaft, and the pinion is engaged with the large gear; the welding gun rotating shaft is mounted and positioned on the welding gun body by means of the upper insulating sleeve and the lower insulating sleeve; and the tungsten electrode is mounted at a tail end of the welding gun rotating shaft by means of the tungsten electrode clamp;

the welding wire feeding and heating assembly comprises a hot wire connection seat, a conductive connecting rod, an upper insulating base, a lower insulating base, a wire guide tube, a contact tip connection seat, and a contact tip; an upper end of the conductive connecting rod is connected to the hot wire connection seat, and a lower end of the conductive connecting rod is connected to the contact tip connection seat; the contact tip is mounted on the contact tip connection seat; the conductive connecting rod is mounted at a left side of the welding gun body by means of the upper insulating base and the lower insulating base; the wire guide tube is mounted on the upper insulating base, a tail end of the wire guide tube is connected to the contact tip, and the hot wire connection seat is connected to a hot wire power cable; the wire guide tube is clamped and positioned on the upper insulating base by means of a retaining clamp, and the retaining clamp is used to adjust a feeding position of a welding wire;

a TIG welding arc generated by the tungsten electrode and a focus point of a laser beam intersect at a place, and together act on a same region; the gas conveying assembly comprises a left gas guide tube and a right gas guide tube, the left gas guide tube and the right gas guide tube are both mounted on the welding gun body and arranged on left and right sides of the welding gun rotating shaft; tail ends of the left gas guide tube and the right gas guide tube are respectively arranged corresponding to left and right gas chambers at a lower end of the welding gun body, and a gas screen is arranged in each gas chamber, and a welding shielding gas is conveyed to the left and right gas chambers at the lower end of the welding gun body through the left gas guide tube and the right gas guide tube, and then are conveyed to a welding arc region by means of the gas screens.

2. The narrow gap laser-TIG arc hybrid welding apparatus according to claim 1, wherein the welding gun rotating shaft is of a double-layer tubular structure, and comprises an outer tube and an inner tube, wherein the outer tube communicates with the inner tube, the outer tube communicates with a water inlet, and the inner tube communicates with a water outlet; and cooling water flows in the outer tube by means of the water inlet and the flows out from the inner tube via the water outlet.

3. A welding method of the narrow gap laser-TIG arc hybrid welding apparatus according to claim 2, further comprising the following steps:

S1, prior to welding
(a) designing a narrow gap groove structure according to the size of a hybrid welding gun, so as to ensure accessibility of a welding gun in a depth direction of a weld seam;
(b) polishing or cleaning a workpiece to be welded, and assembling and positioning the polished or cleaned workpiece to be welded;
(c) adjusting and confirming a spatial position relationship among the welding wire, the laser beam and the tungsten electrode;
(d) checking operating states of the cooling water, a power supply for supplying electricity, the welding shielding gas, and a welding device;
(e) setting welding parameters of the welding wire, the laser beam and a TIG arc, wherein the welding parameters comprise a wire feeding speed, the diameter of the welding wire, a laser defocus amount, a laser power, a swing amplitude and a frequency of laser, a TIG arc current, a voltage, and a length, swing angle and frequency of the tungsten electrode; and S2, during welding
turning on a control switch, enabling a laser spot of the laser beam and arc to act on a surface of the workpiece, synchronously and stably feeding the welding wire into a welding pool, and meanwhile, moving a gun head in a welding direction at a set speed, wherein during the welding, narrow gap welding of a thick plate is finally achieved by means of a swing of the laser spot and a left-right swing of the tungsten electrode.

4. The narrow gap laser-TIG arc hybrid welding apparatus according to claim 1, wherein the left gas guide tube, the welding gun rotating shaft, the right gas guide tube, the conductive connecting rod and the wire guide tube are arranged side by side.

5. A welding method of the narrow gap laser-TIG arc hybrid welding apparatus according to claim 4, further comprising the following steps:

S1, prior to welding
(a) designing a narrow gap groove structure according to the size of a hybrid welding gun, so as to ensure accessibility of a welding gun in a depth direction of a weld seam;
(b) polishing or cleaning a workpiece to be welded, and assembling and positioning the polished or cleaned workpiece to be welded;
(c) adjusting and confirming a spatial position relationship among the welding wire, the laser beam and the tungsten electrode;

(d) checking operating states of the cooling water, a power supply for supplying electricity, the welding shielding gas, and a welding device;
(e) setting welding parameters of the welding wire, the laser beam and a TIG arc, wherein the welding parameters comprise a wire feeding speed, the diameter of the welding wire, a laser defocus amount, a laser power, a swing amplitude and a frequency of laser, a TIG arc current, a voltage, and a length, swing angle and frequency of the tungsten electrode; and S2, during welding
turning on a control switch, enabling a laser spot of the laser beam and arc to act on a surface of the workpiece, synchronously and stably feeding the welding wire into a welding pool, and meanwhile, moving a gun head in a welding direction at a set speed, wherein during the welding, narrow gap welding of a thick plate is finally achieved by means of a swing of the laser spot and a left-right swing of the tungsten electrode.

6. The narrow gap laser-TIG arc hybrid welding apparatus according to claim 1, wherein the welding gun body is of an ultra-thin structure, and has a thickness of 12 mm.

7. The narrow gap laser-TIG arc hybrid welding apparatus according to claim 6, wherein the periphery of the stepper motor, the motor connection seat and the hot wire connection seat is covered with a protective cover.

8. The narrow gap laser-TIG arc hybrid welding apparatus according to claim 7, further comprising a welding gun connection seat, wherein the welding gun connection seat is connected to the welding gun body, the welding gun connection seat is connected to a mounting connecting plate; the mounting connecting plate is arranged outside the protective cover, and the mounting connecting plate is connected to an external walking mechanism.

9. A welding method of the narrow gap laser-TIG arc hybrid welding apparatus according to claim 8, further comprising the following steps:
S1, prior to welding
(a) designing a narrow gap groove structure according to the size of a hybrid welding gun, so as to ensure accessibility of a welding gun in a depth direction of a weld seam;
(b) polishing or cleaning a workpiece to be welded, and assembling and positioning the polished or cleaned workpiece to be welded;
(c) adjusting and confirming a spatial position relationship among the welding wire, the laser beam and the tungsten electrode;
(d) checking operating states of the cooling water, a power supply for supplying electricity, the welding shielding gas, and a welding device;
(e) setting welding parameters of the welding wire, the laser beam and a TIG arc, wherein the welding parameters comprise a wire feeding speed, the diameter of the welding wire, a laser defocus amount, a laser power, a swing amplitude and a frequency of laser, a TIG arc current, a voltage, and a length, swing angle and frequency of the tungsten electrode; and
S2, during welding
turning on a control switch, enabling a laser spot of the laser beam and arc to act on a surface of the workpiece, synchronously and stably feeding the welding wire into a welding pool, and meanwhile, moving a gun head in a welding direction at a set speed, wherein during the welding, narrow gap welding of a thick plate is finally achieved by means of a swing of the laser spot and a left-right swing of the tungsten electrode.

10. A welding method of the narrow gap laser-TIG arc hybrid welding apparatus according to claim 7, further comprising the following steps:
S1, prior to welding
(a) designing a narrow gap groove structure according to the size of a hybrid welding gun, so as to ensure accessibility of a welding gun in a depth direction of a weld seam;
(b) polishing or cleaning a workpiece to be welded, and assembling and positioning the polished or cleaned workpiece to be welded;
(c) adjusting and confirming a spatial position relationship among the welding wire, the laser beam and the tungsten electrode;
(d) checking operating states of the cooling water, a power supply for supplying electricity, the welding shielding gas, and a welding device;
(e) setting welding parameters of the welding wire, the laser beam and a TIG arc, wherein the welding parameters comprise a wire feeding speed, the diameter of the welding wire, a laser defocus amount, a laser power, a swing amplitude and a frequency of laser, a TIG arc current, a voltage, and a length, swing angle and frequency of the tungsten electrode; and
S2, during welding
turning on a control switch, enabling a laser spot of the laser beam and arc to act on a surface of the workpiece, synchronously and stably feeding the welding wire into a welding pool, and meanwhile, moving a gun head in a welding direction at a set speed, wherein during the welding, narrow gap welding of a thick plate is finally achieved by means of a swing of the laser spot and a left-right swing of the tungsten electrode.

11. A welding method of the narrow gap laser-TIG arc hybrid welding apparatus according to claim 6, further comprising the following steps:
S1, prior to welding
(a) designing a narrow gap groove structure according to the size of a hybrid welding gun, so as to ensure accessibility of a welding gun in a depth direction of a weld seam;
(b) polishing or cleaning a workpiece to be welded, and assembling and positioning the polished or cleaned workpiece to be welded;
(c) adjusting and confirming a spatial position relationship among the welding wire, the laser beam and the tungsten electrode;
(d) checking operating states of the cooling water, a power supply for supplying electricity, the welding shielding gas, and a welding device;
(e) setting welding parameters of the welding wire, the laser beam and a TIG arc, wherein the welding parameters comprise a wire feeding speed, the diameter of the welding wire, a laser defocus amount, a laser power, a swing amplitude and a frequency of laser, a TIG arc current, a voltage, and a length, swing angle and frequency of the tungsten electrode; and
S2, during welding
turning on a control switch, enabling a laser spot of the laser beam and arc to act on a surface of the workpiece, synchronously and stably feeding the welding wire into a welding pool, and meanwhile, moving a gun head in a welding direction at a set speed, wherein during the welding, narrow gap welding of a thick plate is finally achieved by means of a swing of the laser spot and a left-right swing of the tungsten electrode.

12. The narrow gap laser-TIG arc hybrid welding apparatus according to claim 1, wherein the hot wire connection seat is connected to an external hot wire mechanism by means of a hot wire power cable.

13. A welding method of the narrow gap laser-TIG arc hybrid welding apparatus according to claim 12, further comprising the following steps:

S1, prior to welding
- (a) designing a narrow gap groove structure according to the size of a hybrid welding gun, so as to ensure accessibility of a welding gun in a depth direction of a weld seam;
- (b) polishing or cleaning a workpiece to be welded, and assembling and positioning the polished or cleaned workpiece to be welded;
- (c) adjusting and confirming a spatial position relationship among the welding wire, the laser beam and the tungsten electrode;
- (d) checking operating states of the cooling water, a power supply for supplying electricity, the welding shielding gas, and a welding device;
- (e) setting welding parameters of the welding wire, the laser beam and a TIG arc, wherein the welding parameters comprise a wire feeding speed, the diameter of the welding wire, a laser defocus amount, a laser power, a swing amplitude and a frequency of laser, a TIG arc current, a voltage, and a length, swing angle and frequency of the tungsten electrode; and S2, during welding
turning on a control switch, enabling a laser spot of the laser beam and arc to act on a surface of the workpiece, synchronously and stably feeding the welding wire into a welding pool, and meanwhile, moving a gun head in a welding direction at a set speed, wherein during the welding, narrow gap welding of a thick plate is finally achieved by means of a swing of the laser spot and a left-right swing of the tungsten electrode.

14. The narrow gap laser-TIG arc hybrid welding apparatus according to claim 1, wherein a laser device used for the laser beam is a YAG solid-state laser device, a semiconductor laser device, or an optical fiber laser device, and the welding wire has a diameter from 0.8 mm to 2.4 mm.

15. A welding method of the narrow gap laser-TIG arc hybrid welding apparatus according to claim 14, further comprising the following steps:

S1, prior to welding
- (a) designing a narrow gap groove structure according to the size of a hybrid welding gun, so as to ensure accessibility of a welding gun in a depth direction of a weld seam;
- (b) polishing or cleaning a workpiece to be welded, and assembling and positioning the polished or cleaned workpiece to be welded;
- (c) adjusting and confirming a spatial position relationship among the welding wire, the laser beam and the tungsten electrode;
- (d) checking operating states of the cooling water, a power supply for supplying electricity, the welding shielding gas, and a welding device;
- (e) setting welding parameters of the welding wire, the laser beam and a TIG arc, wherein the welding parameters comprise a wire feeding speed, the diameter of the welding wire, a laser defocus amount, a laser power, a swing amplitude and a frequency of laser, a TIG arc current, a voltage, and a length, swing angle and frequency of the tungsten electrode; and S2, during welding
turning on a control switch, enabling a laser spot of the laser beam and arc to act on a surface of the workpiece, synchronously and stably feeding the welding wire into a welding pool, and meanwhile, moving a gun head in a welding direction at a set speed, wherein during the welding, narrow gap welding of a thick plate is finally achieved by means of a swing of the laser spot and a left-right swing of the tungsten electrode.

16. A welding method of the narrow gap laser-TIG arc hybrid welding apparatus according to claim 1, specifically comprising the following steps:

S1, prior to welding
- (a) designing a narrow gap groove structure according to the size of a hybrid welding gun, so as to ensure accessibility of a welding gun in a depth direction of a weld seam;
- (b) polishing or cleaning a workpiece to be welded, and assembling and positioning the polished or cleaned workpiece to be welded;
- (c) adjusting and confirming a spatial position relationship among the welding wire, the laser beam and the tungsten electrode;
- (d) checking operating states of the cooling water, a power supply for supplying electricity, the welding shielding gas, and a welding device;
- (e) setting welding parameters of the welding wire, the laser beam and a TIG arc, wherein the welding parameters comprise a wire feeding speed, the diameter of the welding wire, a laser defocus amount, a laser power, a swing amplitude and a frequency of laser, a TIG arc current, a voltage, and a length, swing angle and frequency of the tungsten electrode; and S2, during welding
turning on a control switch, enabling a laser spot of the laser beam and arc to act on a surface of the workpiece, synchronously and stably feeding the welding wire into a welding pool, and meanwhile, moving a gun head in a welding direction at a set speed, wherein during the welding, narrow gap welding of a thick plate is finally achieved by means of a swing of the laser spot and a left-right swing of the tungsten electrode.

* * * * *